United States Patent [19]

White

[11] Patent Number: 4,744,245

[45] Date of Patent: May 17, 1988

[54] ACOUSTIC MEASUREMENTS IN ROCK FORMATIONS FOR DETERMINING FRACTURE ORIENTATION

[75] Inventor: Gary L. White, Dallas, Tex.

[73] Assignee: Atlantic Richfield Company, Los Angeles, Calif.

[21] Appl. No.: 895,753

[22] Filed: Aug. 12, 1986

[51] Int. Cl.[4] .............................................. E21B 47/00
[52] U.S. Cl. ........................................ 73/151; 73/801; 166/250
[58] Field of Search ................. 73/151, 154, 587, 594, 73/801; 367/25, 47, 48; 374/57; 166/250, 251

[56] References Cited

U.S. PATENT DOCUMENTS

| | | | |
|---|---|---|---|
| 4,005,750 | 2/1977 | Shuck | 166/250 X |
| 4,030,345 | 6/1977 | Edmond et al. | 73/801 |
| 4,057,780 | 11/1977 | Shuck | 367/56 X |
| 4,083,604 | 4/1978 | Bohn et al. | 166/251 X |
| 4,107,981 | 8/1978 | Kanagawa et al. | 73/801 |
| 4,109,717 | 8/1978 | Cooke, Jr. | 73/154 X |
| 4,479,204 | 10/1984 | Silverman | 73/589 X |
| 4,508,168 | 4/1985 | Heeren | 166/248 |
| 4,524,434 | 6/1985 | Silverman | 367/37 |

OTHER PUBLICATIONS

D. M. Romrell et al., Monitoring ... By Acoustic Emission, Materials Evaluation, vol. 28, Dec. 1978.
B. R. Dennis et al., Development ... Fractures in Dry Hot Rock, Proc. 22nd International Instrumentation Symposium, May 25-27, 1976.

Primary Examiner—Stewart J. Levy
Assistant Examiner—Kevin D. O'Shea
Attorney, Agent, or Firm—Michael E. Martin

[57] ABSTRACT

A method and system for determining the probable direction of extension of a hydraulically induced fracture in a hydrocarbon bearing formation wherein prior to inducing the fracture, the formation region to be fractured is heated and thermally induced acoustic emissions from the formation are sensed to determine the orientation of the maximum and minimum horizontally directed in situ compressive stresses based on the acoustic emission rate and/or intensity. A device including a microwave energy generator and an array of acoustic transducers is lowered into a wellbore to generate and measure the thermally induced acoustic emissions.

18 Claims, 2 Drawing Sheets

ACOUSTIC MEASUREMENTS IN ROCK FORMATIONS FOR DETERMINING FRACTURE ORIENTATION

BACKGROUND OF THE INVENTION

1. Field of the Invention

This invention pertains to a method for determining the stress field in a subterranean rock formation for predicting the direction of extension of hydraulic fractures in the formation, which information is useful in the development and production of hydrocarbons and other mineral values.

2. Background

The stimulation of subterranean hydrocarbon bearing formations by hydraulic fracturing and similar fracturing techniques is a well-known process for enhancement of the recovery rate of hydrocarbon fluids and similar mineral values. One important aspect of fracturing processes pertains to the requirement or desirability of knowing the direction in which the principal fracture will extend. Subterranean formations of at least medium depth are typically in a state of triaxial compression with the largest principal stress oriented vertically. There are, thus, maximum and minimum principal stresses whose magnitudes are less than the vertical principal stress.

Under this stress condition, for hydraulic fractures to occur, the pressure of the fluid to be injected into the formation must overcome the pore pressure and the minimum in situ compressive stress which is generally in the horizontal direction. Typically, a vertical two-winged fracture occurs in the formation subject to the above stress field and extends in the same direction as the maximum principal horizontal stress or, in other words, in a direction perpendicular to the minimum in situ horizontal stress.

The direction of fracture extension is important to the placement of production wells which will produce the fluids whose recovery is enhanced by the fracturing and subsequent stimulation processes. Accordingly, the expected direction of formation fractures is very important to the efficient recovery of hydrocarbon fluids and other mineral values.

Several methods have been proposed for determining the direction of the expected extension of a hydraulic fracture including measurement of shifting or tilting of the earth's surface in the vicinity of the fracture utilizing devices known as tiltmeters and devices for recording seismic events resulting from the fracture extension. A presentation entitled "Comparison of Hydraulic Fracture Orientation Techniques" by L. L. Lacy (Society of Petroleum Engineers, Paper No. SPE 13225) discusses some aspects of the abovementioned methods.

Moreover, it is indicated that heating of subterranean rock formations generates acoustic emissions which are dependent on the temperature of the formation and the in situ stress. A presention by B. Johnson, A. F. Gangi and J. Handin entitled "Thermocracking of Rocks Subjected to Slow, Uniform Temperature Changes" (proceedings of the nineteenth U.S. Symposium on Rock Mechanics, Mackay School of Mines, University of Nevada, Reno, Nev., 1978) discusses the relationship between a subterranean formation under compressive stress when subjected to heating and the acoustic emissions generated by such activity.

In accordance with the present invention, the acoustic phenomena resulting from increasing the temperature generally uniformly in a rock formation from a particular location such as a wellbore is measured to determine the direction of maximum and minimum horizontal stress and thus the probable direction of hydraulic fracture extension. Clearly, the determination of the direction of hydraulic or other man made fracture extension in a particular subterranean formation will provide for more precise placement of wells or the conduction of other operations which might be more efficiently or effectively carried out with the knowledge of the direction which such fractures will take or will likely take as a result of the orientation of the principal stresses acting on the formation.

SUMMARY OF THE INVENTION

The present invention provides a method of determining the in situ horizontal stress field utilizing measurements taken of thermally induced acoustic emissions resulting from substantially uniform or preselected directional heating of a subterranean formation.

In accordance with one aspect of the present invention, a subterranean formation is heated uniformly or in a predetermined direction with respect to a reference point and measurements of the acoustic emissions from the locally heated rock or earth material are recorded to determine the emission rate and/or emission intensity. The acoustic emissions are used in mapping the in situ horizontal stress field for prediction of the direction which hydraulic or other artificially induced fractures will propagate.

In accordance with another aspect of the present invention there is provided a system for thermally heating a subterranean rock formation and for measuring the acoustic emissions of the rock formation as a result of the heating process by an array of acoustic signal transducers whereby the acoustic signal field may be recorded and correlated with the in situ horizontal stress field.

The above mentioned aspects and superior features of the invention as well as additional advantages thereof will be further appreciated by those skilled in the art upon reading the detailed description which follows in conjunction with the drawing.

DESCRIPTION OF PREFERRED EMODIMENTS

Figure 1:
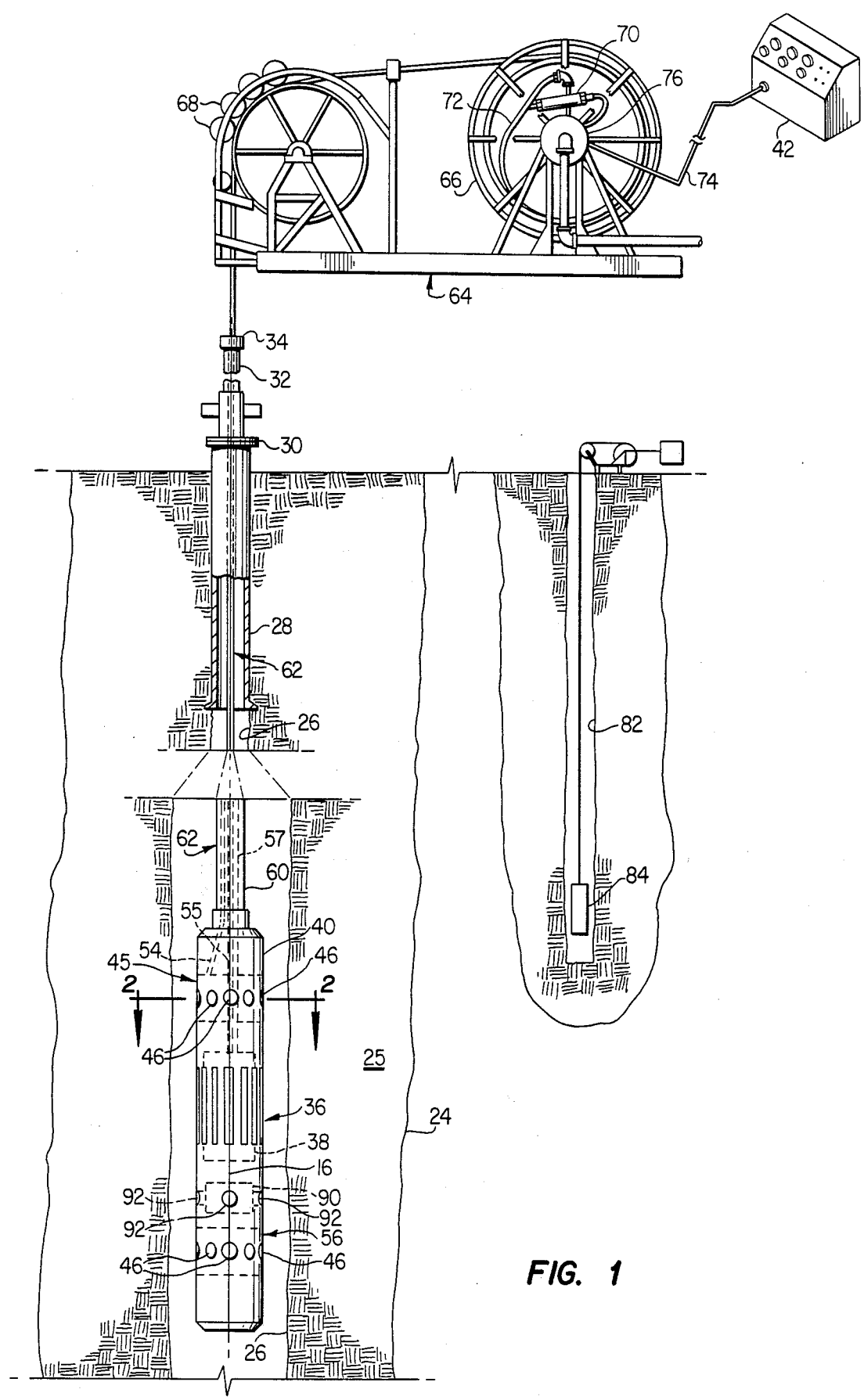
FIG. 1 is a view of a system for determining the generally horizontal in situ stress field in a subterranean formation by acoustic measurements in accordance with the present invention.

In the description which follows, like parts are marked throughout the specification and drawing with the same reference numerals, respectively. The drawing figures are not necessarily to scale and most of the features of the invention are shown in somewhat schematic form in the interest of clarity and conciseness.

Figure 3:
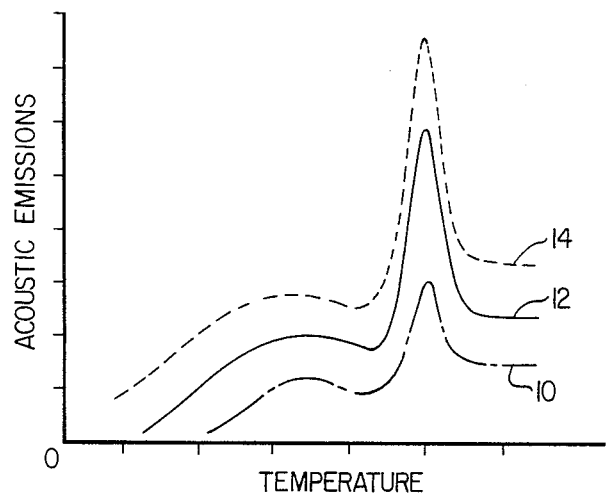
FIG. 3 is a diagram of temperature verses acoustic emissions for a particular rock formation showing the variation in acoustic emission rate for different stress levels and temperatures of the formation.

Referring briefly to FIG. 3, there is illustrated a plot of acoustic emissions, which may be characterized as an emission rate of acoustic events per unit time or per degree of temperature. The acoustic emissions are indicated in increasing values in the ordinate of the diagram of FIG. 3 and the abscissa represents increasing temperature. The characteristics of subterranean rock formations with respect to the emission of acoustic signals in the form of intense pulses, which may be generated by microcrack formation as the temperature of the rock is increased, is a function of temperature and is believed to also be a function of the in situ stress at the point of measurement. The characteristics of the acoustic emission rate in the diagram of FIG. 3, by way of example, are typical for a rock formation during the slow heating of Westerly Granite, for example. The plot designated by the numeral 10, for example, illustrates an emission rate measured at a particular depth and at a particular in situ stress condition while the plots represented by the curves 12 and 14 indicate the emission rate as a function of temperature for progressively greater in situ stress conditions at the general depth or level of measurement. Accordingly, the frequency of acoustic events and, it is believed, the level of acoustic intensity is proportional to the total compressive stress in the formation and is also a function of the temperature as indicated by the diagram.

Figure 4:
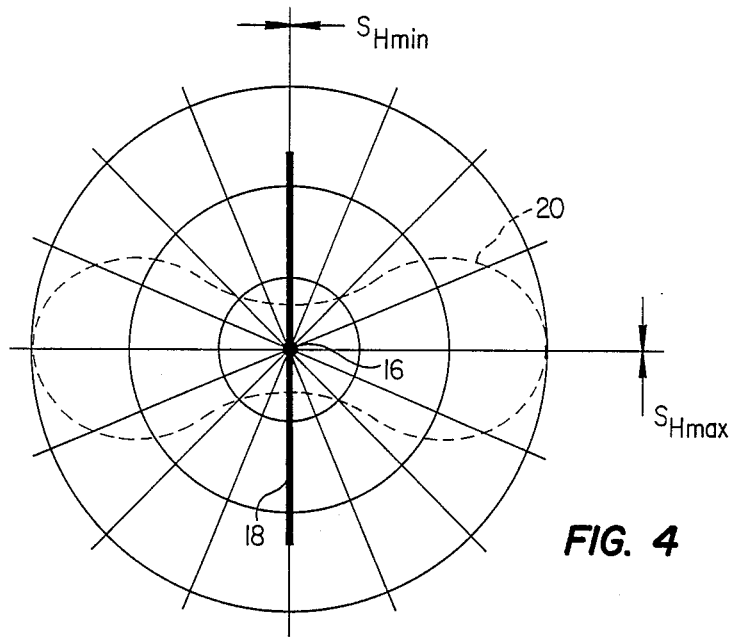
FIG. 4 is a polar plot of acoustic emissions from a particular formation as determined in accordance with the present invention.

It is also known that the total compressive stress in a subterranean formation may be resolved into vertical and horizontal components and that the direction of the minimum horizontal stress, see FIG. 4, as indicated by the vectors indicating the stress $S_{Hmin}$ re disposed in a direction normal to the maximum horizontal stress as indicated by the vectors $S_{Hmax}$. From previous development work, it is indicated that a hydraulic fracture will extend in the direction of the maximum horizontal stress ($S_{Hmax}$) and thus in a direction normal to the minimum horizontal stress ($S_{Hmin}$).

FIG. 4 is a polar diagram having as its central axis the axis 16 of a wellbore, also indicated in FIG. 1. The concentric circles of the diagram of FIG. 4 represent values of acoustic emission rate or intensity and the radial lines from the axis 16 are directional lines. A characteristic two-winged vertically extending fracture is indicated by the numeral 18 in FIG. 4 as extending generally in the direction of the maximum horizontal stress ($S_{Hmax}$). Accordingly, knowledge of the direction of the extension of a fracture such as the fracture 18 is of considerable importance in developing reservoirs of hydrocarbon fluids, for example. Since the rate of acoustic emissions, and quite possibly the acoustic signal intensity, can be correlated with the level of stress in a formation which has been uniformly heated in a predetermined direction, the measurement of an acoustic event rate and/or its intensity may be plotted on a diagram as shown in FIG. 4 to provide the curve 20 which indicates a signal rate or intensity which is at maximum at the point of maximum horizontal compressive stress and which is at a minimum at the point of minimum horizontal compressive stress. In this way, polar plots of particular rock formations believed to be capable of yielding hydrocarbon fluids, for example, when hydraulically fractured are of particular significance for determining the direction of the fracture extension and the plotting of wells or other operations which can be carried out to produce fluids from a reservoir in the formation.

Referring now to FIG. 1, the present invention contemplates the provision of a system for uniformly heating a subterranean rock formation and for selectively measuring acoustic signals in a particular range with respect to the axis 16 to determine the direction of maximum and minimum horizontal stresses and the probable direction of extension of a hydraulic fracture induced in the formation. FIG. 1 shows in somewhat schematic form, a subterranean formation 24 including a zone of interest 25 into which a wellbore 26 has been drilled and has been left at least partially in the "open hole" condition. Typically, the upper portion of the wellbore 26 may be provided with a casing 28 and a wellhead 30, including suitable conventional devices such as a wireline lubricator 32 and a stuffing box 34.

In accordance with this invention, it is contemplated that a device, generally designated by the numeral 36, be lowered into the wellbore 26 in the region of the formation 24 to be measured wherein the device includes means for heating the formation generally uniformly about the axis 16 or in a selected circular sector range with respect to the axis 16. Concomitantly with heating the formation 24 or after heating is ceased acoustic emissions from the formation are sensed in a range also about the axis 16, and signals generated by acoustic sensors are recorded, thus providing the information necessary to develop the curve 20 in polar plot illustrated in FIG. 4. Preferably, the heating means provided in the device 36 might comprise a microwave generator, generally designated by the numeral 38, for generating radio frequency energy to heat the formation 24. The radio frequency energy or microwave generator 38 may be of a type known in the art. Such microwave generating and transmitting systems are described in U.S. Pat. Nos. 4,508,168 to V. L. Heeren and 4,301,865 to R. S. Kasevich, et al., for example. A commercially available type of radio frequency or microwave heating system for heating a subterranean formation has been tested by R. F. Oil Industries Limited, Toronto, Canada. In the device 36, a source of radio frequency range electromagnetic energy, such as the generator or transmitter 38, is disposed in a downhole canister 40. Alternatively, the source of radio frequency range energy may be disposed at the surface from a combination control unit and energy source, generally designated by the numeral 42 in FIG. 1 for transmission to a downhole antenna disposed in the canister 40.

Figure 2:
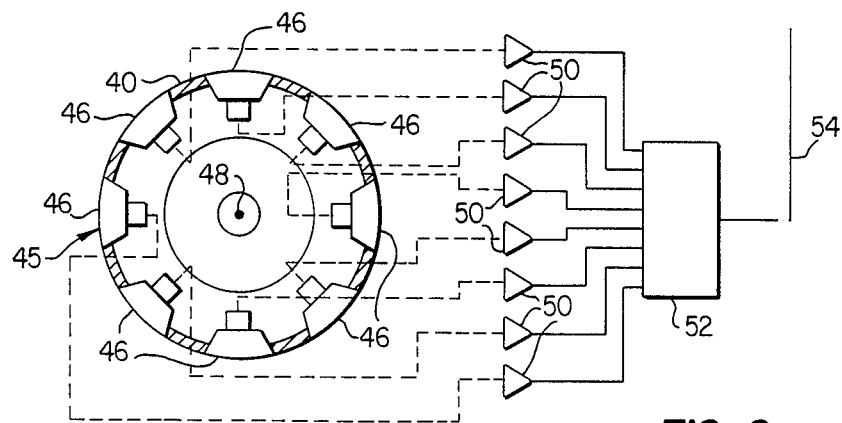
FIG. 2 is a section view and schematic diagram, in combination, of a portion of the system illustrated in FIG. 1.

Still further in accordance with the present invention, the downhole device 36 includes an array 45 of acoustic signal sensors or transducers, each designated by the numeral 46. The transducers 46 may be of a piezoelectric type or another suitable type adapted to operate in a subterranean wellbore and in the presence of relatively high temperatures. FIG. 2 illustrates an array of transducers 46 circumferentially spaced apart with respect to a central axis 48 of the device 36, which axis is normally coincident with the wellbore axis 16 or substantially so when the device 36 is placed in service in accordance with a method of the present invention. The transducers 46 are each typically adapted to be in circuit with suitable amplifiers 50 which produce amplified signals to a suitable multiplexing circuit 52 for transmission via conductor 54 to the control unit 42, FIG. 1. A second array 56, FIG. 2, of acoustic transducers 46 may be disposed below the first array and arranged so that a plurality of transducers are disposed in a predetermined angular relationship relative to the transducers 46 of the first array 45. The transducers 46 of both arrays 45 and 56 are, of course, disposed in a predetermined known angular relationship relative to the casing 40 of the device 36. The transducer array 56 may also be connected in a circuit similar to that described in FIG. 2 with a signal conducting cable extending to the control unit 42.

One preferred way of placing the device 36 in the borehole 26 is illustrated in FIG. 1 wherein the housing 40 is connected to the lower distal end 60 of an elongated tube 62 which extends through the wellhead 30 from an apparatus commonly known as a coiled tubing unit, generally designated by the numeral 64. The coiled tubing unit 64 is of a type commercially available and includes a rotatable storage reel 66 for storing a length of tubing thereon. The tubing 62 is trained over a drive wheel arrangement 68 for straightening, and lowering and raising the tubing with respect to the wellbore. Conductor cables 54, 55 and 57 for conducting signals to and from the transducer arrays 45 and 56 and the microwave generator 38 may be disposed within the tubing 62 and extend from a take-off device 70 at the upper end 72 of the tubing 62. Suitable conductor means 74 leading from the control unit 42 may be in communication with the upper end of the conductors 54, 55 and 57 through a slipring assembly 76 forming part of the coiled tubing unit 64.

By connecting the device 36 to a somewhat rigid means for lowering the device into the wellbore 26, the angular orientation of the transducer arrays 45 and 56 may be predetermined so that the signals generated by the transducers may be plotted with respect to a known direction of the respective transducers in each array. Alternatively, the device 36 could be lowered on the end of a conventional drill string or on a wireline cable. If a device 36 is placed in the wellbore by some means wherein a predetermined angular orientation of the device with respect to the axis 16 is not known or needs to be confirmed, an acoustic source may be placed in a known position relative to the wellbore 26 to generate a signal to be recorded by the transducer arrays 45 and/or 56 so that a bearing or azimuth may be determined for the transducer arrays. FIG. 1 illustrates such a means wherein a second relatively shallow wellbore 82 is provided at a predetermined distance and direction with respect to the wellbore 26. An explosive charge 84 is placed in the wellbore 82 and, at a predetermined time is detonated to generated acoustic signals in the earth formation 24. In this way, the angular orientation with respect to the axis 16 of each of the transducers 46 may be determined in accordance with which one of the transducers receives the acoustic signal of maximum intensity as a result of detonation of the charge 84. The generation of an acoustic signal as described above may be used to confirm the angular orientation of the device 36 with respect to the axis 16 even if the device is positioned on the end of a nonrotatable drillstem or the coiled tube 62 and the angular orientation of the tube or drillstem is known at the surface, since it is possible that some angular twist may be imparted through the drillstem if disposed in a deviated wellbore, for example.

In carrying out the unique method of the present invention, a particular formation to be fractured, such as the formation 24, is penetrated by one or more wellbores at selected locations to form, for example, the wellbore 26. The device 36 is lowered into the wellbore in the formation region to be analyzed and the angular orientation of the transducer arrays 45 and 56 with respect to the wellbore axis is determined either by noting the rotational position of the drillstem or coiled tubing 62 or by generating an acoustic signal such as by detonating an explosive charge in a second wellbore, such as the wellbore 82, which is at a known position relative to the wellbore 26.

When the angular orientation of the transducers 46 is known, radio frequency range energy is imparted to the formation 24 through the device 36 until substantially uniform heating of the formation within the vicinity of the wellbore 26 is achieved in a predetermined range about the axis 16. After a predetermined period of time, the heating operation may be terminated and during heating of the formation as well as during a cooldown period, acoustic emissions from the formation are sensed by the transducers 46 and signals related to the emissions sensed by the transducers are recorded by the control unit 42 so that a polar plot of the rate and/or intensity of the emissions, such as the plot 20, may be obtained. In this way, the direction of the maximum principal horizontal stress and the direction of the minimum horizontal stress may be predetermined. Moreover, since it is indicated that the rate and/or intensity of thermally induced acoustic emissions in rock formations are related to the magnitude of the in situ stresses, the actual stress magnitude may also be determined. This information is useful in determining the operating parameters in carrying out a hydraulic fracture operation.

As shown in FIG. 1, the device 36 may also include pyrometer means 90 having a plurality of circumferentially spaced apart sensors 92 for measuring the temperature distribution over the range of the formation 24 about the axis 16. The rate and/or intensity of acoustic emissions may be compared with the temperature of the formation 24 as a means of measuring the compressive stresses in the formation. This information can, of course, be useful in determining in situ stress distribution and stress level for preparing a hydraulic fracturing operation.

Although preferred embodiments of a method and a system for carrying out the method in accordance with the present invention have been described herein, those skilled in the art will recognize that various substitutions and modifications may be made to the specific embodiments described without departing from the scope and spirit of the invention as recited in the appended claims.

What I claim is:

1. A method for determining the probable orientation of a hydraulically induced fracture in a predetermined region of a subterranean earth formation comprising the steps of:
   penetrating into said region with borehole means;
   heating said region to an elevated temperature;
   measuring thermally induced acoustic emissions of said formation at said region and over an angular range with respect to a generally vertical reference axis of said borehole means; and
   comparing the acoustic emissions over said range to determine the directional orientation of at least one of the maximum and minimum horizontal in situ compressive stresses in said region.

2. The method set forth in claim 1 including the step of:
   artificially heating said formation to an elevated temperature prior to measuring the acoustic emissions.

3. The method set forth in claim 2 wherein:

said step of heating said formation is carried out by dispersing radio frequency range electromagnetic radiation into said formation to heat said formation to a predetermined temperature.

4. The method set forth in claim 3 wherein:
said step of heating said formation includes forming a wellbore penetrating said formation;
providing a device to be inserted into said wellbore for transmitting radio frequency range radiation into said formation from said wellbore, and generating radiation to be dispersed into said formation over a predetermined angular range with respect to the longitudinal axis of said wellbore.

5. The method set forth in claim 4 wherein:
said device includes acoustic transducer means for sensing acoustic emissions from said formation over a predetermined angular range with respect to said axis; and
said method includes the step of sensing acoustic emissions from said formation with said transducer means for determining the orientation of at least the generally horizontal in situ stresses in said formation as a function of the acoustic emissions generated over said range.

6. The method set forth in claim 5 including the step of:
positioning said device in said wellbore in a predetermined angular orientation with respect to said axis so that the azimuthal position of said transducer means is known prior to sensing said acoustic emissions.

7. The method set forth in claim 5 including the step of:
providing an acoustic source located at a predetermined azimuth with respect to said axis;
generating acoustic emissions from said acoustic source and sensing said acoustic emissions with said transducer means to determine the angular orientation of said transducer means in said wellbore.

8. A method for determining the probable orientation of a hydraulically induced fracture in a predetermined region of a subterranean earth formation comprising the steps of:
penetrating said region with borehole means;
artificially heating said region to an elevated temperature;
then measuring thermally induced acoustic emissions of said region and over a range with respect to a generally vertical reference axis of said borehole means;
comparing the acoustic emissions over said range to determine the orientation of the horizontal in situ compressive stresses in said region;
measuring the temperature of said formation at said region; and
comparing the acoustic emissions from said region at said measured temperature with known values of acoustic emissions at said measured temperature and at selected values of in situ stresses in samples of said formation to determine the in situ stresses in formation at said region.

9. A method for determining the probable orientation of a hydraulically induced fracture in a predetermined region of a subterranean earth formation comprising the steps of:
penetrating into said region with borehole means;
measuring thermally induced acoustic emissions of said formation at said region and over an angular range with respect to a vertical reference axis of said borehole means; and
comparing the acoustic emissions over said range to determine the orientation of the horizontal in situ compressive stresses in said region.

10. A method for determining the orientation of the horizontal in situ compressive stresses in a subterranean earth formation with respect to a wellbore penetrating within said formation comprising the steps of:
heating said formation to increase the temperature of said formation in a predetermined zone in said formation;
measuring thermally induced acoustic emissions of said formation in said zone and over a predetermined angular range with respect to a longitudinal reference axis of said wellbore;
comparing the acoustic emissions over said angular range to determine the orientation of the horizontal in situ compressive stresses in said formation in said zone;
measuring the temperature of said formation in said zone; and
comparing the acoustic emissions from said formation at said measured temperature with known values of acoustic emissions at said measured temperature and at selected values of in situ stresses in samples of said formation to determine the in situ stresses in said formation in said zone.

11. A method for determining the orientation of the horizontal in situ compressive stresses in a subterranean earth formation with respect to a wellbore penetrating within said formation comprising the steps of:
forming a wellbore penetrating within said formation;
inserting a device into said wellbore for transmitting radiation into said formation from said wellbore, and generating radiation to be dispersed into said formation over a predetermined angular range with respect to a longitudinal reference axis of said wellbore for heating said formation to increase the temperature of said formation in a predetermined zone in said formation;
measuring thermally induced acoustic emissions of said formation in said zone and over a predetermined angular range with respect to said longitudinal reference axis of said wellbore; and
comparing the acoustic emissions over said range to determine the orientation of the horizontal in situ compressive stresses in said formation in said zone.

12. The method set forth in claim 11 wherein:
said device includes acoustic transducer means for sensing acoustic emissions from said formation over a predetermined angular range with respect to said axis; and
said method includes the step of sensing acoustic emissions from said formation with said transducer means for determining the orientation of at least the generally horizontal in situ stresses in said formation as a function of the acoustic emissions generated over said range.

13. The method set forth in claim 12 including the step of:
positioning said device in said wellbore in a predetermined angular orientation with respect to said axis so that the azimuthal position of said transducer means is known prior to sensing said acoustic emissions.

14. The method set forth in claim 12 including the step of:
  providing an acoustic source located at a predetermined azimuth with respect to said axis;
  generating acoustic emissions from said acoustic source and sensing said acoustic emissions with said transducer means to determine the angular orientation of said transducer means in said wellbore.

15. A system for determining the orientation of at least the generally horizontal in situ stresses in a subterranean formation comprising:
  a device adapted to be inserted into a wellbore extending within said formation, said device including means for transmitting radio frequency range radiation into said formation from said wellbore over a predetermined angular range with respect to the longitudinal central axis of said wellbore and acoustic transducer means for sensing acoustic emissions from said formation over a predetermined angular range with respect to said axis and generating signals related to said acoustic emissions; and
  means for receiving said signals so that said signals can be recorded for determining the orientation of at least the generally horizontal in situ stresses in said formation with respect to said axis.

16. The system set forth in claim 15 including:
  means associated with said device for measuring the temperature of said formation in a zone of interest and over a predetermined angular range with respect to said axis.

17. The system set forth in claim 15 including:
  means for lowering said device into said wellbore at a predetermined angular position about said axis.

18. The system set forth in claim 15 wherein:
  said transducer means comprises an array of plural transducers mounted in a housing of said device and circumferentially spaced apart about an axis of said housing.

* * * * *